Sept. 12, 1933.   R. RENFRO   1,926,420
COMBINED RACING GREYHOUND HARNESS AND RIDER SUPPORTING MEANS
Filed Dec. 7, 1932   2 Sheets-Sheet 2

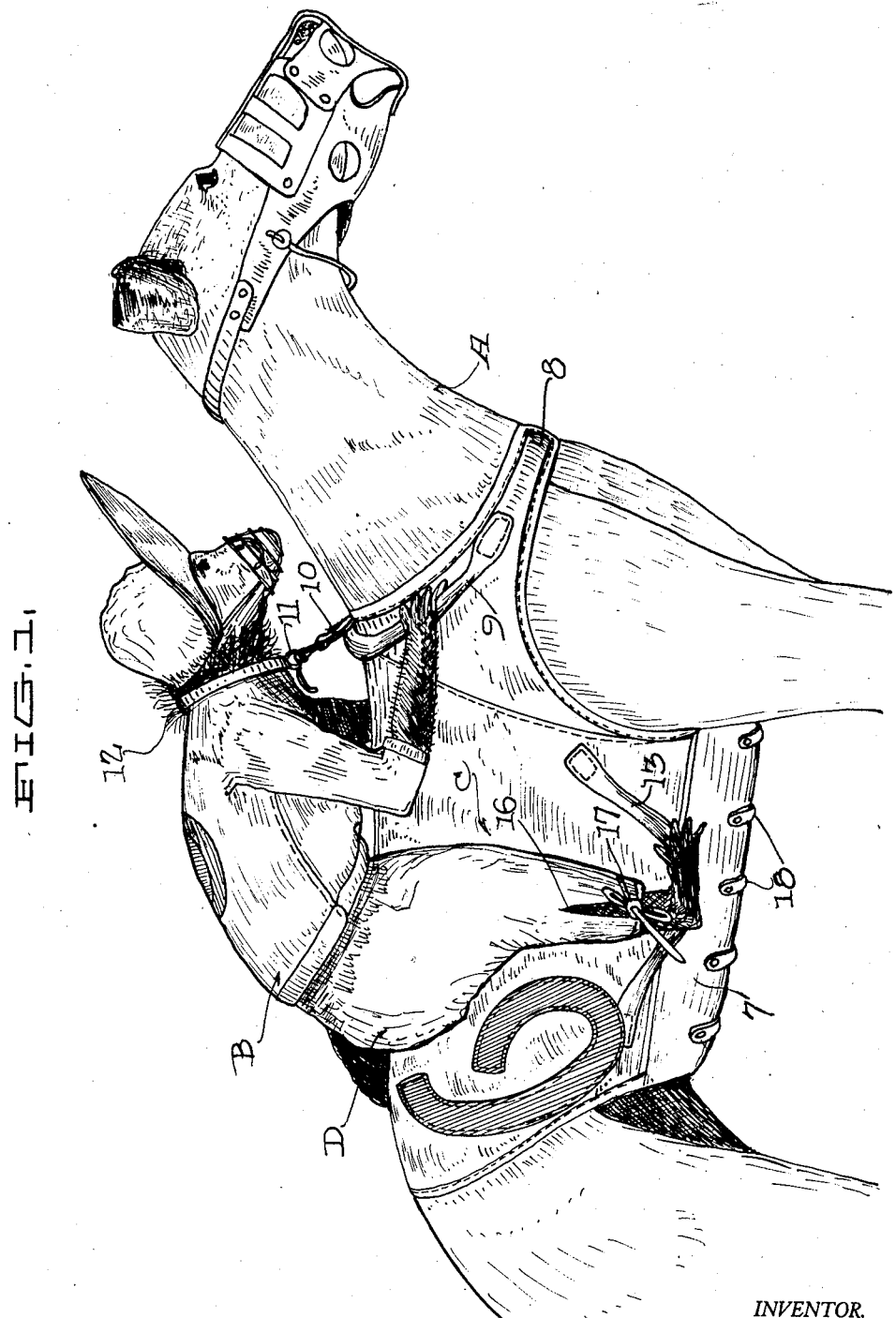

Patented Sept. 12, 1933

1,926,420

UNITED STATES PATENT OFFICE 1,926,420

COMBINED RACING GREYHOUND HARNESS AND RIDER SUPPORTING MEANS

Rennie Renfro, Van Nuys, Calif., assignor of one-half to Wayne R. Hancock, Van Nuys, Calif.

Application December 7, 1932. Serial No. 646,173

5 Claims. (Cl. 54—1)

This invention relates to improvements in harness constructions and has particular reference to a combined racing greyhound harness and rider supporting means.

The principal object of the invention is to provide a novel and unique harness construction that will provide a comfortable dog fitting apparatus and a cooperating rider support that will safely retain the jockey in position on the back of the greyhound.

A further object is to provide an apparatus of the character described that is simple in construction, economical to manufacture, durable and highly efficient in use.

Other objects and advantages will be apparent during the course of the following description.

In the accompanying drawings forming a part of this specification and in which like numerals are employed to designate like parts throughout the same, Fig. 1 is a side elevation showing the rider in starting position on the greyhound, with the harness portion of the device encircling the body of the racer, and the monkey rider positioned in the rider retaining member, Fig. 2 is a plan view of the device, constructed in accordance with my device, and Fig. 3 is a side elevation of the same.

In the sport of greyhound racing, that is enjoyed by dog fanciers and racing enthusiasts, there has been recently introduced, the use of monkey riders, who serve in the capacity of jockeys. Because of the aptitude and imitative tendencies of simians, when they are positioned on the backs of their fleet charges, they imitate the actions of regular jockeys. The employment of the monkey jockey adds considerable zest and enjoyment to the sport. However, as in horse racing, there is always present the danger of the rider being accidentally thrown, and unless some means is provided for safely securing the riders, there is ever present the hazard of the rider being dislodged, with consequent injury. To, therefore, provide a safe, humane, unique and most efficient means for retaining the monkey rider on the greyhound to assure against accidental displacement of the jockey from the racing charge, I have devised the present combined harness and rider support.

In the accompanying drawings wherein for the purpose of illustration is shown a preferred embodiment of my invention, the reference character A designates the greyhound, and the reference character B the rider. The harness member is designated, as a whole, by the reference character C and the main rider support, which is a pair of pants or breeches, is designated by the reference character D. The harness C embodies in its construction a central portion 5, a right end portion 6 and a left end portion 7. The said harness member is preferably made of fabric to assure lightness in weight, and is also padded to provide a comfortable fitting about the body of the greyhound. Secured to the front end of the harness member 5, is a neck engaging portion 8 that encircles the neck of the greyhound and has secured thereto a pair of straps 9, that serve as hand-holds for the rider. This neck engaging portion 8 has, likewise, secured thereto a snap fastener 10 adapted to engage a ring 11 carried by a collar 12 positioned about the neck of the rider. This construction serves as a medium for securing the upper body portion of the rider to the harness 5, and assures the assuming of a jockeying position by the rider. However, in practice, because of the imitative qualities of the monkey, he nestles his head close to the neck of the racing greyhound. It will be noted that a pair of stirrups are likewise provided, which are indicated by the numerals 13, which are secured to the harness on the lower sides thereof. These serve as mediums in which the feet of the rider rest and provide a gripping medium for said feet (note Fig. 1).

As disclosed to advantage in Figs. 2 and 3, the saddle portion D is in the form of a pair of breeches that are sewed, as at 14, to the upper surface of the harness and extend lengthwise thereof. The pants portion serves to retain therein the lower portion of the body of the rider and a suitable waist encircling strap 15 is provided to assure a retention of the rider in the pants portion. I also propose to slit the lower portion of the pants as at 16, and to equip the slit ends with straps 17 that are tied about the leg portion of the rider. In order that the harness C may be suitably adjusted to the girth of the racer, straps 18 and buckles 19 are provided on the respective left and right end portions of the harness.

From the description outlined it will be obvious that the rider is safely retained against accidental dislodgment in the saddle portion of the harness, and at the same time a comfortable body encircling saddle is provided for the greyhound. In practice the device has proven to be most efficient, humane and because of its novel construction, has added to the enthusiasm and entertainment of racing patrons.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. A riding device comprising harness means adapted to be positioned about the body of an animal, adjustable securing means for said harness means, means secured to said harness means and including waist and leg holding portions.

2. A riding device comprising harness means, means for adjustably securing the harness means about the body of an animal, and rider receiving means secured to said harness means and including a pair of breeches.

3. A riding device comprising harness means, rider receiving means secured to said harness means and including waist and leg holding portions, and foot and hand gripping means for said rider and secured to the harness means.

4. A device of the character described, comprising a harness member adapted to be positioned about the body of a racer, and means secured to said member for retaining the lower portion of a body of the rider in a fixed position on said racer, said means comprising a pair of breeches fixedly secured to the harness member, and hand and foot holds carried by said harness member for receiving the hands and feet of the rider.

5. A device of the character described, comprising a body encircling member adapted to be positioned about the body of a greyhound racer, said member including a main body portion and a neck encircling portion, and a saddle member sewed to said harness member and comprising a pair of breeches fixedly secured to the harness member for retaining the lower portion of the body of a rider in a fixed position on said racer.

RENNIE RENFRO.